C. D. BURCHENAL.
FILTER.
APPLICATION FILED MAR. 10, 1916.

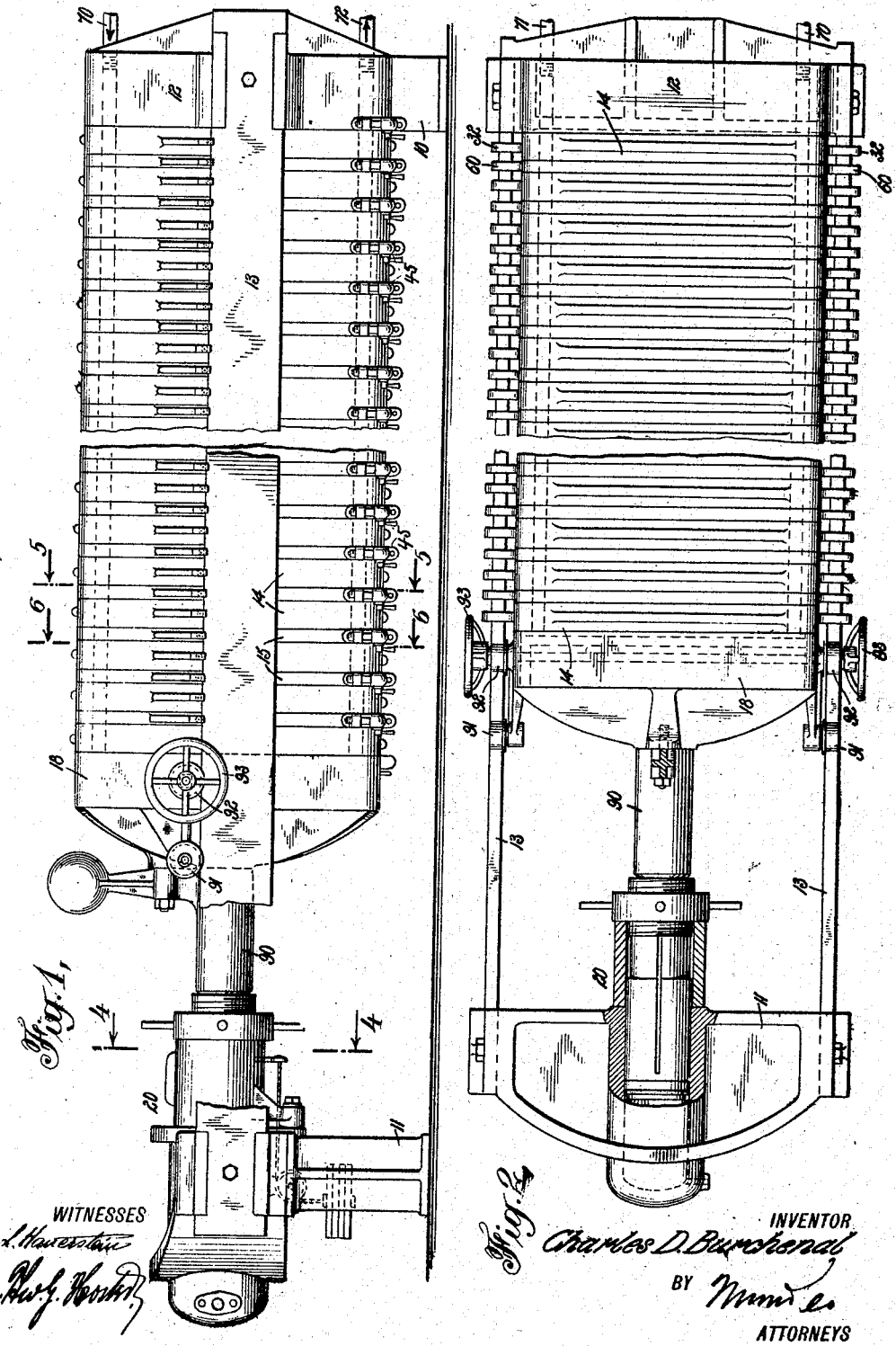

1,194,949.

Patented Aug. 15, 1916.
3 SHEETS—SHEET 2.

WITNESSES

INVENTOR
Charles D. Burchenal
BY
ATTORNEYS

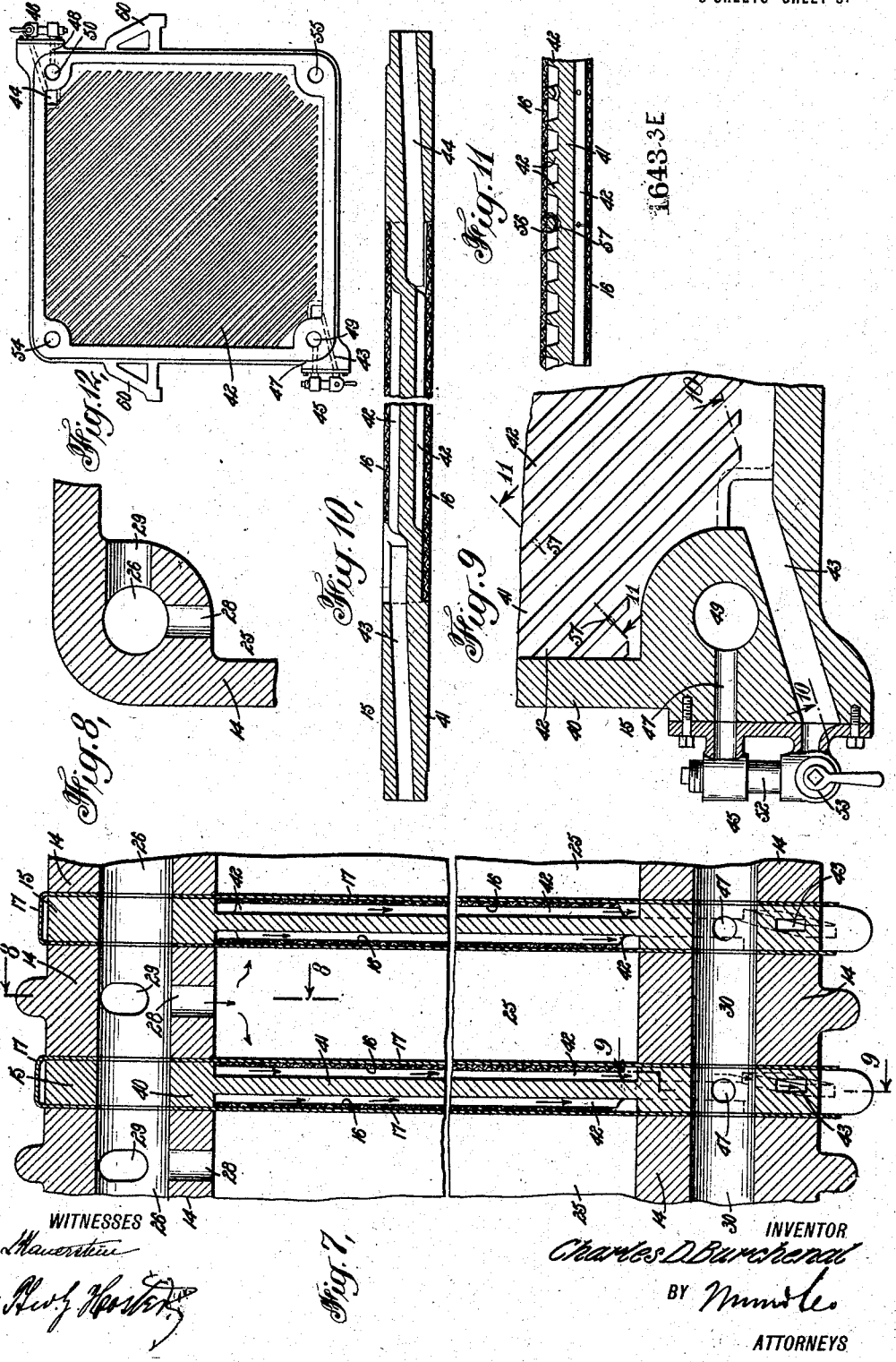

UNITED STATES PATENT OFFICE.

CHARLES D. BURCHENAL, OF NEW YORK, N. Y.

FILTER.

1,194,949. Specification of Letters Patent. Patented Aug. 15, 1916.

Application filed March 10, 1916. Serial No. 83,280.

*To all whom it may concern:*

Be it known that I, CHARLES D. BURCHENAL, a citizen of the United States, and a resident of the city of New York, borough of Manhattan, in the county and State of New York, have invented a new and Improved Filter, of which the following is a full, clear, and exact description.

The invention relates to filters for filtering sugar cane juice and other liquids of a similar nature, and its object is to provide a new and improved filter arranged to insure a rapid and thorough filtering of the liquid with a view to increase the output of the filter over similar ones of about the same size, to reduce the loss of heat to a minimum, to insure detection of a leak in any individual section of the filter and to allow of cutting out such section for the time being without interfering with the proper filtering action of the remaining sections.

Another object is to permit of properly washing the residue cake after the filtering operation is completed.

In order to accomplish the desired result, use is made of alternating cells and plates, of which the cells are connected with a supply of the liquid to be filtered, and each plate is provided on both faces with ribs forming spaces leading to an outlet, and a filtering medium interposed between the successive cells and plates and formed of a piece of filtering cloth and a screen, the latter resting on the ribs and the filtering cloth facing the corresponding cell.

A practical embodiment of the invention is represented in the accompanying drawings forming a part of this specification, in which similar characters of reference indicate corresponding parts in all the views.

Figure 4:
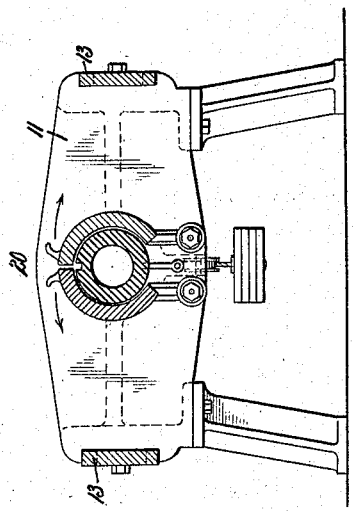
Figure 6:
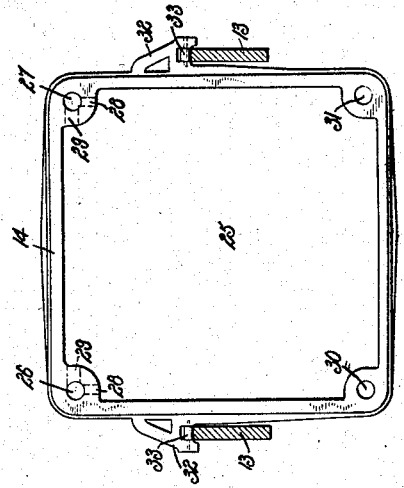
Figure 3:
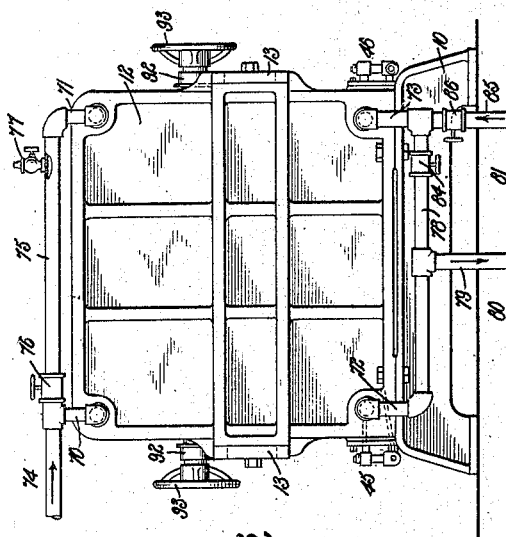
Figure 5:
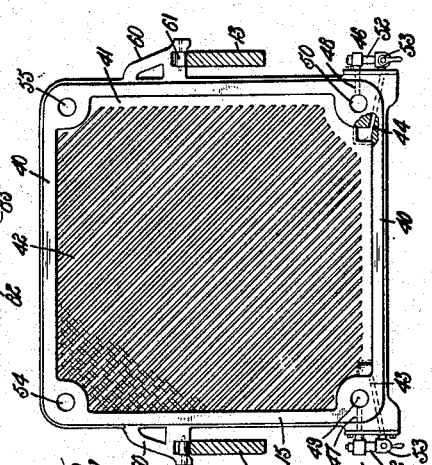

Figure 1 is a side elevation of the filter; Fig. 2 is a plan view of the same with parts in section; Fig. 3 is an elevation of the outer end of the filter; Fig. 4 is a cross section of the hydraulic ram for the filter, the section being on the line 4—4 of Fig. 1; Fig. 5 is a cross section of the filter on the line 5—5 of Fig. 1; Fig. 6 is a similar view of the same on the line 6—6 of Fig. 1; Fig. 7 is an enlarged sectional side elevation of a view of the alternating cells, plates and filtering media; Fig. 8 is a cross section of the same on the line 8—8 of Fig. 7; Fig. 9 is a similar view of the same on the line 9—9 of Fig. 7; Fig. 10 is a sectional plan view of one of the plates and its filtering media, the section being on the line 10—10 of Fig. 9; Fig. 11 is a similar view of the same on the line 11—11 of Fig. 9; and Fig. 12 is a face view of a modified form of one of the plates.

The filter is mounted on standards 10 and 11, of which the standard 10 supports a stationary filter head 12 connected at its sides by longitudinally extending guiding supports 13 with the other standard 11. The supports 13 support alternately arranged cells 14 and plates 15, between which are arranged the filtering media, preferably in the form of a filtering cloth 17 resting against a woven wire screen, as hereinafter more fully explained. As shown in Figs. 1 and 2, the last cell 14 at the right-hand side of the filter rests against the head 12, and the last cell 14 at the left-hand side of the filter is engaged by a head 18 slidable on the support 13 and controlled by a hydraulic ram 20 or other suitable means for holding the cells 14 and the plates 15 firmly in assembled relation between the heads 12 and 18.

Each of the cells 14 (see Figs. 6, 7 and 8) is in the form of a rectangular frame, the opening 25 of which is faced by the two filtering cloths 17 interposed between a cell and the next adjacent plate 15. The upper corners of each cell 14 are provided with longitudinally extending inlet passages 26 and 27, each connected by two inlets 28 and 29 with the chamber or opening 25 to fill the latter with the liquid to be filtered. The lower corners of each cell 14 are provided with longitudinally extending outlet passages 30 and 31. The sides of each cell 14 are provided with brackets 32 carrying friction rollers 33 mounted to travel on the upper edges of the supports 13 to allow easy movement of each cell when assembling or disassembling the cells and plates.

Each of the plates 15 consists of a rectangular frame 40, similar in size and shape to the cell 14, and each plate 15 is provided with a web 41 interiorly connected with the sides, top and bottom of the frame 40. On the faces of each web 41 are formed diagonal ribs 42, of which the ribs on one face run in an opposite direction to the ribs on the other face, as indicated in Fig. 5. The ribs 42 terminate at their lower ends a distance from the corresponding adjacent bottom and side of a frame 40 to allow the filtrate to run readily to the bottom of each frame at each face of the plate. One face of the plate 15 is provided at its bottom with a downwardly and outwardly inclined opening 43 leading to one side of the plate, and the other face is similarly connected at the opposite side by an opening 44 with the said other side of the plate, as will be readily understood by reference to Fig. 5. The outer ends of the openings 43 and 44 are connected by sight and valve connections 45 and 46 with openings 47 and 48 leading into outlet passages 49 and 50 formed longitudinally in the lower corners of the plate 15. Each of the connections 45 and 46 is provided with a sight glass 52 and with a valve 53 for connecting the corresponding face of a plate with the corresponding passage 49 or 50. The passages 49 and 50 are in register with the passages 30 and 31 of the adjacent cells 14. The upper corners of each plate 15 are provided with longitudinally extending passages 54 and 55 in register with the passages 26 and 27 of adjacent cells 14. The screens 16 overlie the ribs 42 and are fastened thereto by suitable fastening devices 56 (see Fig. 11) passing through apertures 57 in sundry of the ribs 42. The ribs 42 are of such a depth and the screens 16 are of such thickness that when the screens are fastened in place the outer faces thereof are flush with the faces of the frame 40, as will be readily understood by reference to Fig. 7. The filtering cloth 17 is of a width corresponding to that of the frame 40 and is of a length to allow of doubling up the cloth to extend over the top of the frame on both faces of a plate to the bottom thereof, so that one piece of filtering cloth is only needed for each single plate 15, as will be readily understood by reference to Fig. 7. The filtering cloth is provided with apertures in register with the passages 54, 55, 49 and 50. The sides of the plates 15 are provided with brackets 60 carrying friction rollers 61 mounted to travel on the upper edges of the supports 13 to allow easy traveling of the plates 15 when assembling or disassembling the parts of the filter.

From the foregoing, it will be seen that by the arrangement described, the passages 26, 27, 30 and 31 of the cells 14 are in register with the passages 54, 55, 49 and 50 of the plates 15, thus providing uninterrupted passages in the corners of the assembled cells and plates 14 and 15. The passages 26, 27, 30 and 31 of the last cell 14 on the left-hand side of the machine are closed by the head 18 and the passages 26, 27, 30 and 31 of the last cell at the right-hand side of the machine connect with pipes 70, 71, 72 and 73 screwed or otherwise secured in the head 12. The pipe 70 connects with a supply pipe 74 (see Fig. 3), and the pipe 71 connects by a branch pipe 75 with the supply pipe 74, and in this branch pipe 75 is arranged a valve 76 and a vent cock 77. On filling the filter with the liquid to be filtered, the valve 76 is closed while the vent cock 77 is opened so that the cells are readily filled with the liquid by way of the branch pipe 75 and the passages 26 and 54 while the air can escape by way of the passages 27 and 55, the pipe 71 and the vent cock 77. After the filter is charged with the liquid the vent-cock 77 is closed and the valve 76 is preferably opened to allow of supplying the filter with liquid through both sets of passages 26, 54 and 27, 55. The pipes 72 and 73 are connected with each other by a pipe 78 from which leads a branch pipe 79 connected with pipes 80 and 81, of which the pipe 80 serves to conduct the filtrate to a suitable place of discharge while the pipe 81 serves to discharge the wash water to a suitable place of discharge. The pipes 80 and 81 are provided with suitable valves 82 and 83 to permit of making use of either of the pipes 80 or 81, as above explained. The pipe 78 is provided with a valve 84 and the pipe 73 connects with a pipe 85 provided with a valve 86, and this pipe 85 may be connected with a steam or water supply for washing out the residue cake in the chambers 25 prior to removing said cake from the filter, as hereinafter more fully explained. When the filter is in use, the filtrate passes into the chambers 25 of the cells 14, as above explained, and then filters through the filtering cloth 17 and the screens 16 onto the corresponding faces of the plates 15 from which the filtrate passes by way of the openings 43 and 44 to the connections 45, 46 to finally pass into the longitudinal passages 49, 50 in register with the passages 30 and 31 to conduct the filtrate to the pipes 72 and 73 from which the filtrate is discharged by way of the pipes 78, 79 and 80 to a suitable place of discharge. It is understood that during the use of the filter the vent cock 77 is closed as well as the valves 83 and 86 while the valves 76, 82 and 84 are opened. When it is desired to wash out the cake remaining in the chambers 25 the valves 82 and 84 are closed and the valves 83 and 86 are opened so that steam or water can pass through the pipe 73 into the longitudinal passages 31, 50 to pass by the connections 46 and the openings 44 onto one face of each filter plate 15 and through the corresponding screen 16 and filtering cloth 17 into the residue material contained in the chamber 25. The wash water flows through the filter cloth 17 and the screen 16 on the other face of the chamber 25 onto the corresponding face of the plate 15 to then pass by way of the openings 43 and connections 45 into the longitudinal passages 30, 49 to the pipes 72, 79 and 81 to be carried by the latter to a suitable place of discharge. A connecting block 90 mounted to swing on the head 18 is mounted out of the path of the hydraulic ram 20 to allow of running the head 18 to the left with a view of moving the cells 14 and plates 15 apart for the removal of the washed cakes and for the removal and cleaning of the filtering cloth 17. The head 18 is provided at each side with wheels 91 and 92 mounted to travel on the supports 13, and on the axles of the wheels 92 are mounted hand wheels 93 to permit the operators to conveniently move the head 18 along the supports 13.

Instead of arranging the outlets for each plate 15 at the lower corners the same may be arranged at diagonally opposite corners, as plainly indicated in Fig. 12, it being understood that the inlets are arranged on the two other corners.

It will be noticed that when the liquid to be filtered is forced through the filter the filtrates after passing through the filtering media on opposite sides of each chamber 25 flow to opposite sides of the filter into the corresponding passages, thus providing a ready outflow of the filtrates thereby increasing the capacity of the filter without unduly increasing the size thereof.

By providing the sight connections at each side the operator can readily see the filtrate and according to the observed condition can readily determine whether each unit is acting properly.

If desired or necessary, any one face of any plate can be disconnected from the corresponding outflow passage on closing the valve in the corresponding sight and valve connection. Thus if a leak should occur in any one filtering media it can be readily seen by the operator at the sight glass and the corresponding valve closed to eliminate this face of this filter plate without interfering with the actions of the opposite face of this same filter plate. By locating the outflow passages within the filter and dispensing entirely with open outlets or gutters, the filtrates are not liable to be rendered impure by dust or other extraneous matter and the loss of heat by direct radiation into the open air is entirely prevented.

By providing each plate with ribs on both faces the plate is greatly strengthened, thus allowing the use of lighter plates. As the cells and plates are symmetrical they can be readily assembled. The plates are all alike and hence can be used interchangeably, and as both faces of each plate are alike, the plate can be reversedly used.

Having thus described my invention, I claim as new and desire to secure by Letters Patent:

1. A filter, comprising alternating cells and plates and filtering mediums between them, the cells and plates being provided with a longitudinal supply passage opening into all the cells, and the cells and plates being provided at opposite sides with longitudinal outlet passages, each plate being connected at one face with the outlet passage on one side of the filter and each plate having its other face connected with the outlet passage on the other side of the filter.

2. A filter, comprising alternating cells and plates and filtering mediums between them, the cells and plates being provided with a longitudinal supply passage opening into all the cells and the cells and plates being provided at opposite sides with longitudinal outlet passages, each plate being connected at one face with the outlet passage on one side of the filter and each plate having its other face connected with the outlet passage on the other side of the filter, and a valve in each connection between a face of a plate and the corresponding outlet passage to permit of closing such face to the outlet passage.

3. A filter, comprising alternating cells and plates and filtering mediums between them, the cells and plates being provided with a longitudinal supply passage opening into all the cells and the cells and plates being provided at opposite sides with longitudinal outlet passages, and exterior connections at opposite sides of the filter and of which a connection at one side of the filter connects the outlet passage at this side of the filter with one face of a corresponding plate, and a connection at the other side of the filter connects the outlet passage at this other side of the filter with the other face of the same plate.

4. A filter, comprising alternating cells and plates and filtering mediums between them, the cells and plates being provided with a longitudinal supply passage opening into all the cells and the cells and plates being provided at opposite sides with longitudinal outlet passages, and exterior connections at opposite sides of the filter and of which a connection at one side of the filter connects the outlet passage at this side of the filter with one face of a corresponding plate, and a connection at the other side of the filter connects the outlet passage at this other side of the filter with the other face of the same plate, each of the said connections having a sight glass and a valve.

5. A filter provided with a plate having ribs on both faces, longitudinally extending outlet passages formed in the plate at the sides thereof, and transversely extending outlet openings, of which one leads from one face of the plate and is connected with the adjacent outlet passage and the other outlet opening leads from the other face of the plate and connects with the other outlet passage.

6. A filter, comprising alternating cells and plates and filtering mediums between them, the cells and plates being provided with a longitudinal supply passage opening into all the cells, and the cells and plates being provided with longitudinal outlet passages, each plate having openings at opposite sides, of which one connects with one of the faces of a plate and the other connects with the other face of the same plate to receive the filtrate from both plate faces, and exterior connections on each plate connecting the said plate openings with the corresponding outlet passages.

7. A filter, comprising alternating cells and plates and filtering mediums between them, the cells and plates being provided with a longitudinal supply passage opening into all the cells, and the cells and plates being provided with longitudinal outlet passages, each plate having openings at opposite sides, of which one connects with one of the faces of a plate and the other connects with the other face of the same plate to receive the filtrate from both plate faces, and exterior connections on each plate connecting the said plate openings with the corresponding outlet passages, each of the said connections having a sight glass and a shut-off valve.

8. A filter provided with a filtering unit, comprising a plate provided with ribs on both faces and having openings for receiving the filtrate from the corresponding face, the plate having passages and exterior connections connecting the said openings with the corresponding passages and including a sight glass and a shut-off cock, and filtering media overlying the ribs on both faces of the plate.

9. A filter provided with a filtering plate having a marginal frame, a central web and diagonal ribs on each face of the web, the ribs lying within the planes of the faces of the frame, the ribs terminating at their lower ends a distance from the bottom member of the frame, the web and frame having openings at opposite sides leading at their inner ends to the said plate faces of the web at the bottom member of the frame, and the said openings leading to the outside of the frame, passages in the said plate at opposite sides, outside connections connecting the said openings with the corresponding passages, screens overlying the said ribs and approximately flush with the faces of the frame, and a filtering cloth overlying the said screen and stretched over the faces of the said frame.

10. A filter, comprising alternating cells and plates and filtering mediums between the same, the said cells and plates being provided at their upper corners with longitudinal inlet passages each connected with the interior of each cell, the said cells and plates being provided at their lower corners with longitudinal outlet passages, of which one is in connection with one face of a plate and the other is in connection with the other face of the same plate.

11. A filter, comprising alternating cells and plates and filtering mediums between the same, the said cells and plates being provided at their upper corners with longitudinal inlet passages each connected with the interior of each cell, the said cells and plates being provided at their lower corners with longitudinal outlet passages, each plate being provided at both faces with ribs for the filtering mediums to rest against, each plate having downwardly and outwardly inclined openings at the lower corners, the opening at one side leading to one face of the plate and the other opening leading to the other face of the same plate, and exterior valve and sight connections connecting each opening with the corresponding outlet passage at the same corner.

In testimony whereof I have signed my name to this specification in the presence of two subscribing witnesses.

CHARLES D. BURCHENAL.

Witnesses:
 THEO. G. HOSTER,
 PHILIP D. ROLLHAUS.